(12) United States Patent
Khoury

(10) Patent No.: US 12,358,584 B2
(45) Date of Patent: Jul. 15, 2025

(54) VERTICAL BICYCLE MOUNT SYSTEM

(71) Applicant: Blake Khoury, Baytown, TX (US)

(72) Inventor: Blake Khoury, Baytown, TX (US)

(*) Notice: Subject to any disclaimer, the term of this patent is extended or adjusted under 35 U.S.C. 154(b) by 0 days.

(21) Appl. No.: 18/494,751

(22) Filed: Oct. 25, 2023

(65) Prior Publication Data
US 2025/0136211 A1   May 1, 2025

(51) Int. Cl.
B62H 3/12   (2006.01)

(52) U.S. Cl.
CPC .................................. B62H 3/12 (2013.01)

(58) Field of Classification Search
CPC .... B62H 3/12; B62H 3/04; B62H 3/08; A47F 5/08
USPC .............. 211/19, 18, 87.01, 89.01; 248/683, 248/205.3, 309.1, 311.2, 305, 339
See application file for complete search history.

(56) References Cited

U.S. PATENT DOCUMENTS

| | | | | |
|---|---|---|---|---|
| 599,645 A * | 2/1898 | Snyder | ..................... | B62H 3/12 211/19 |
| 605,628 A * | 6/1898 | Bradley | ..................... | B62H 3/00 D12/115 |
| 625,657 A * | 5/1899 | Elliott | ..................... | A61M 25/04 604/104 |
| 713,888 A * | 11/1902 | Kellner | ................ | A47B 61/003 292/17 |
| 4,063,647 A * | 12/1977 | Blackmore | .............. | B62H 3/12 248/316.7 |
| 4,159,773 A * | 7/1979 | Losenno | ................. | A47G 29/08 248/176.2 |
| 5,014,955 A * | 5/1991 | Thompson | .............. | B63B 32/83 441/74 |
| 5,078,276 A * | 1/1992 | Rogge | ...................... | B62H 3/12 248/289.11 |
| 5,246,120 A * | 9/1993 | Walker | ..................... | B62H 3/12 211/21 |
| 5,402,977 A * | 4/1995 | Korfgen | ................. | A47K 10/10 211/89.01 |
| 5,549,231 A * | 8/1996 | Fletcher | .................... | B60R 9/06 211/20 |
| 6,877,613 B2 * | 4/2005 | Bleazard | .................. | B62H 3/04 211/5 |
| 7,669,822 B2 * | 3/2010 | Kluge | ..................... | F16B 45/00 248/306 |
| 7,690,516 B1 * | 4/2010 | Crump | ..................... | B62H 3/12 211/19 |
| 7,721,900 B2 * | 5/2010 | Waterman | ............. | A47F 7/0028 211/89.01 |
| 2007/0241071 A1 * | 10/2007 | Antonioni | ............. | A47F 5/0807 211/87.01 |
| 2022/0048583 A1 * | 2/2022 | Lauzon | .................... | B62H 3/08 |

* cited by examiner

Primary Examiner — Jennifer E. Novosad

(57) ABSTRACT

A bicycle mount system for vertically attaching a bicycle to a wall. The system comprises a wall support member, a bracket member fixedly attached to the upper portion of the wall support member, wherein the bracket member comprises a substantially flat portion for attachment to the wall support member and an arm member for engaging a wheel of the bicycle. An anchor passes through the flat portion of the bracket member and the wall support member to engage the wall. One or more soft fasteners are attached to the back of the wall support member.

4 Claims, 6 Drawing Sheets

VERTICAL BICYCLE MOUNT SYSTEM

BACKGROUND

Bicycle storage devices come in a wide variety of designs to meet the needs of many unique storage situations. Bicycles also come in wide variety of styles, sizes, weights, and shapes. Accordingly, not all bicycles work with all storage racks. Most people store their bicycles using kickstands, floor standing mounts, or wall-mounted hooks. While prior art bicycle storage devices are often convenient for some users, they may not effectively store the bicycle in a manner that is space-friendly or gentle on the user, the bike, or the storage environment itself.

One particular problem is faced by users who rent their living accommodations, such as an apartment or condo. These "renters" tend to stay in a rental property for a relatively short period of time, such as 6 months or 1 year. At the end of the rental period, the renter must vacate the property, and is typically liable to the landlord for any damage caused to the rental property. This same principle also applies for homeowners who want a storage solution that causes minimal damage to their own home as well.

Many modern bicycles are commonly made from expensive hi-tech materials that are easy to damage and expensive to replace or repair, thus it is often desired to store the bicycle safely, that is, out of the weather and away from the risk of theft. Because rental property and smaller homes typically have limited space for storage in general, bicycle storage inside the property is often a difficult challenge. Because floor space is at a premium, prior art devices exist that enable a bicycle owner to securely store a bicycle vertically by fastening it to a wall using a number of anchor bolts, lag bolts, masonry bolts, toggle bolts, construction screws, or any other suitable fasteners. These wall-mounted storage solutions are problematic for renters or homeowners because of the expensive damage caused to the walls of the property.

What is still needed is a device for storing a bicycle vertically that minimizes wall damage.

SUMMARY OF THE INVENTION

The present invention relates to a vertical bicycle mount system that serves the purpose of safely storing a bicycle of any size, design, or shape in a vertical fashion.

A bicycle mount system for vertically attaching a bicycle to a wall is provided, the system including a wall support member and a bracket member fixedly attached to the upper portion of the wall support member, wherein the bracket member comprises a substantially flat portion for attachment to the wall support member and an arm member for engaging a wheel of the bicycle. An anchor passes through the flat portion of the bracket member and the wall support member to engage the wall. One or more soft fasteners attached to the back of the wall support member.

Also provided is a method for vertically attaching a bicycle to a wall, including the steps of providing the aforementioned bicycle mount system, anchoring the bicycle mount system to the wall, and attaching the bicycle to the bicycle mount system by engaging a wheel of the bicycle with the arm member. The wheel may be the front wheel of the bicycle, wherein the rear wheel of the bicycle is in resting engagement with the wall support member. The wheel may alternatively be the rear wheel of the bicycle, wherein the front wheel of the bicycle is in resting engagement with the wall support member.

BRIEF DESCRIPTION OF FIGURES

The features and advantages of the present invention will be more clearly understood from the following description taken in conjunction with the accompanying drawings in which.

DETAILED DESCRIPTION OF EMBODIMENTS

The present invention relates to a bicycle mount system that serves the purpose of safely storing a bicycle of any size, weight, design, or shape in a vertical fashion.

Figure 4:
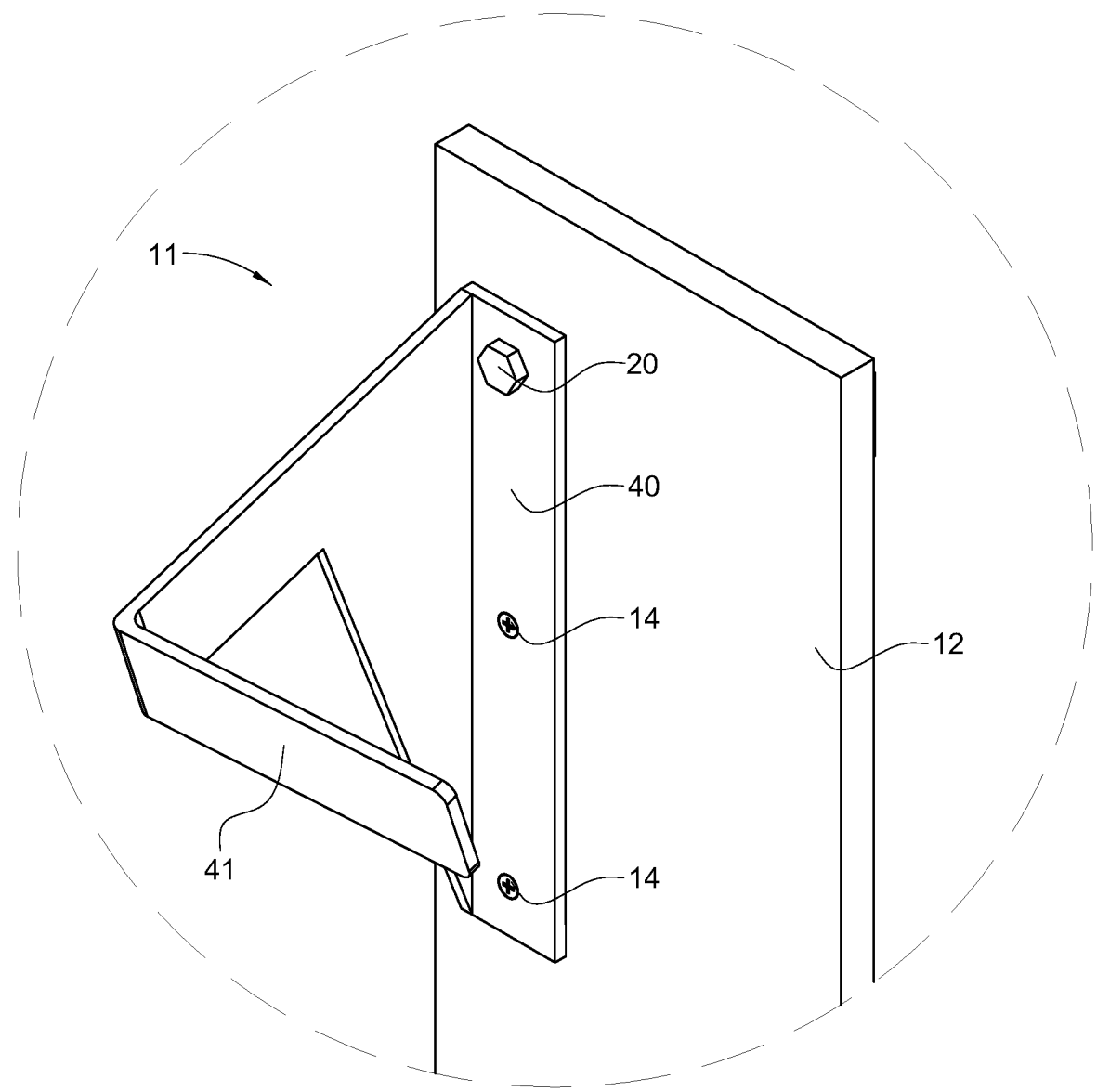
FIG. 4 depicts a front perspective view of an exemplary bracket of the bicycle mount system of FIG. 1.
Figure 5:
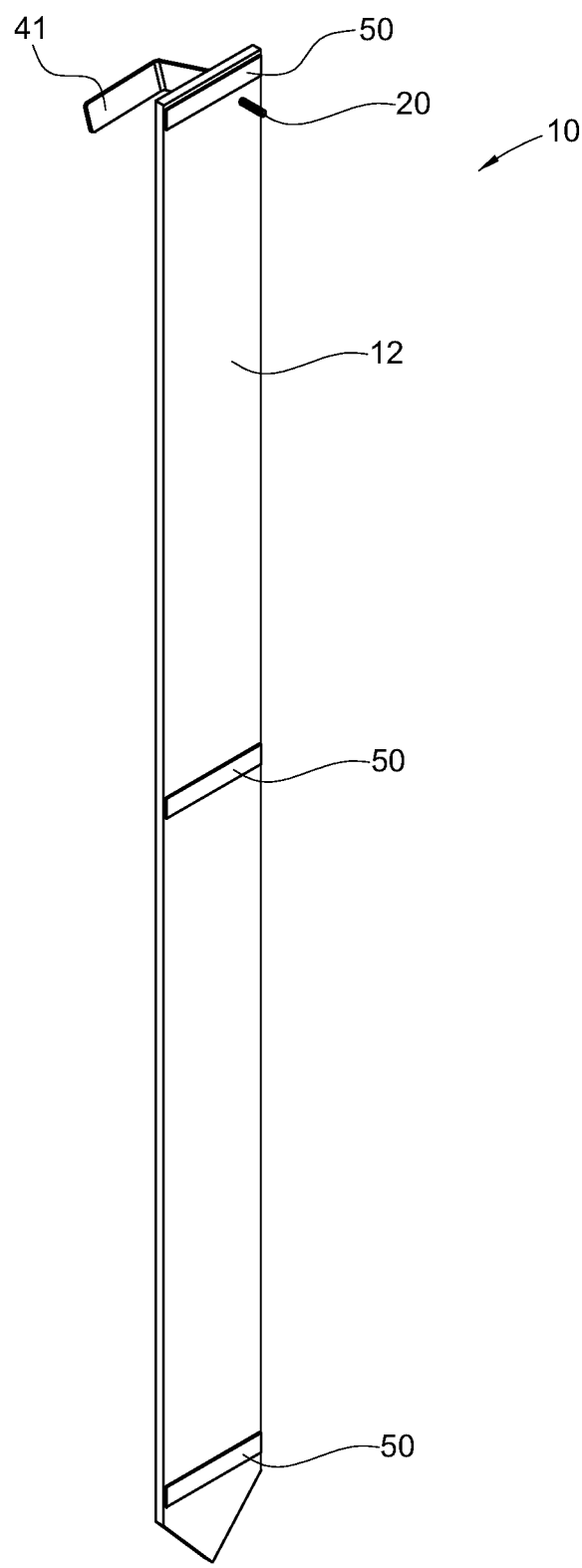
FIG. 5 depicts a rear perspective view of the bicycle mount system of FIG. 1.
Figure 6:
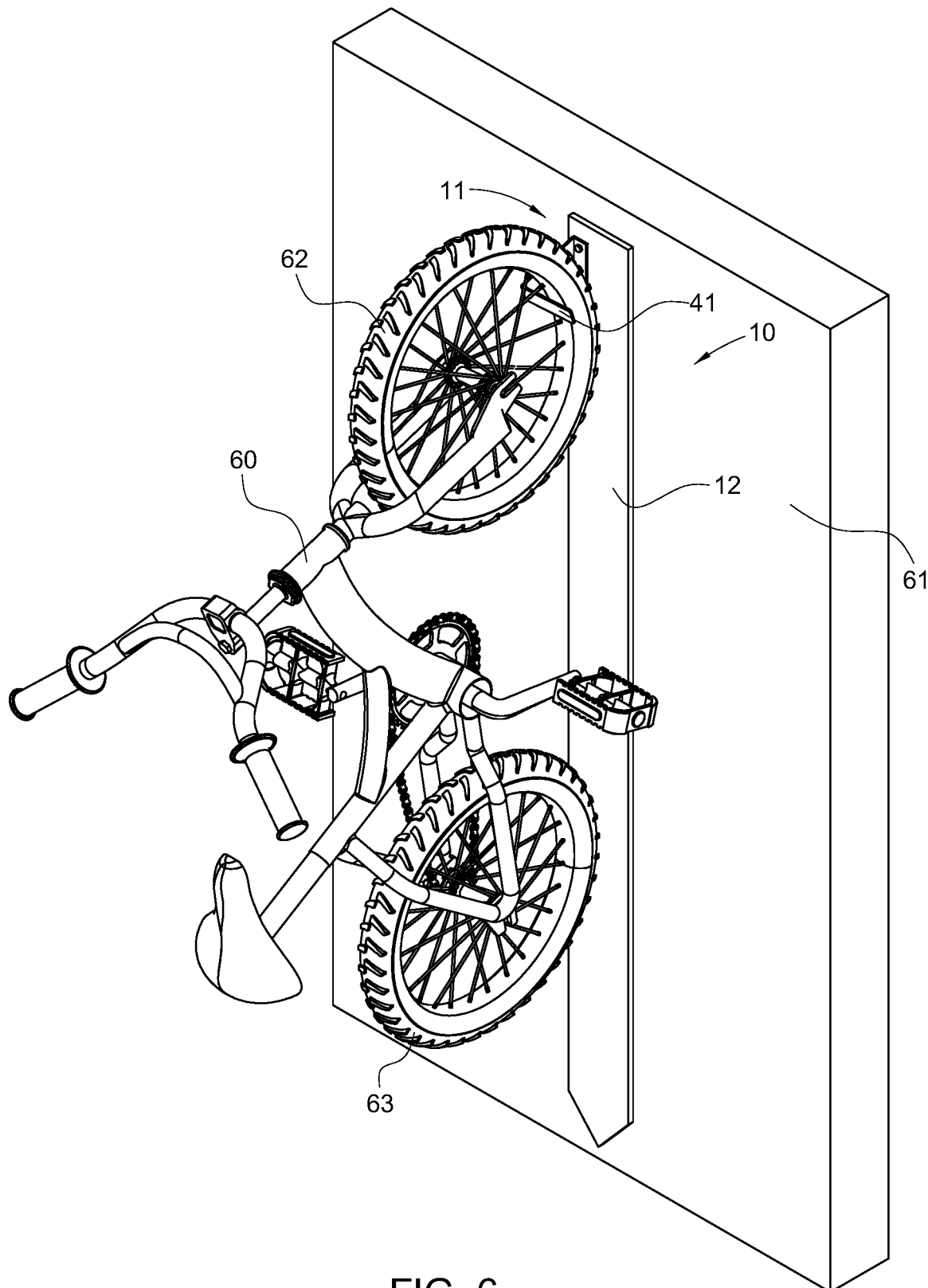
FIG. 6 depicts a front perspective view of the bicycle mount system of FIG. 1 attached to a wall, with a bicycle positioned thereon.

Referring now to the drawings, and more particularly to FIGS. 1-6, a first preferred embodiment of the present invention is shown, with bicycle mount system 10 for mounting or otherwise holding a bicycle 60. Bicycle mount system 10 may be used to mount any desired bicycle of any size, weight, design, or shape. Bicycle mount system 10 may be mounted on a wall 61 so that bicycle 60 is attached vertically, suspended by one of its wheels. As shown in FIG. 6, bicycle 60 is preferably suspended from the front wheel 62 with the bicycle pointed upward. Alternatively, bicycle 60 may be suspended from the rear wheel 63 with the bicycle pointed downward (not shown).

Figure 1:
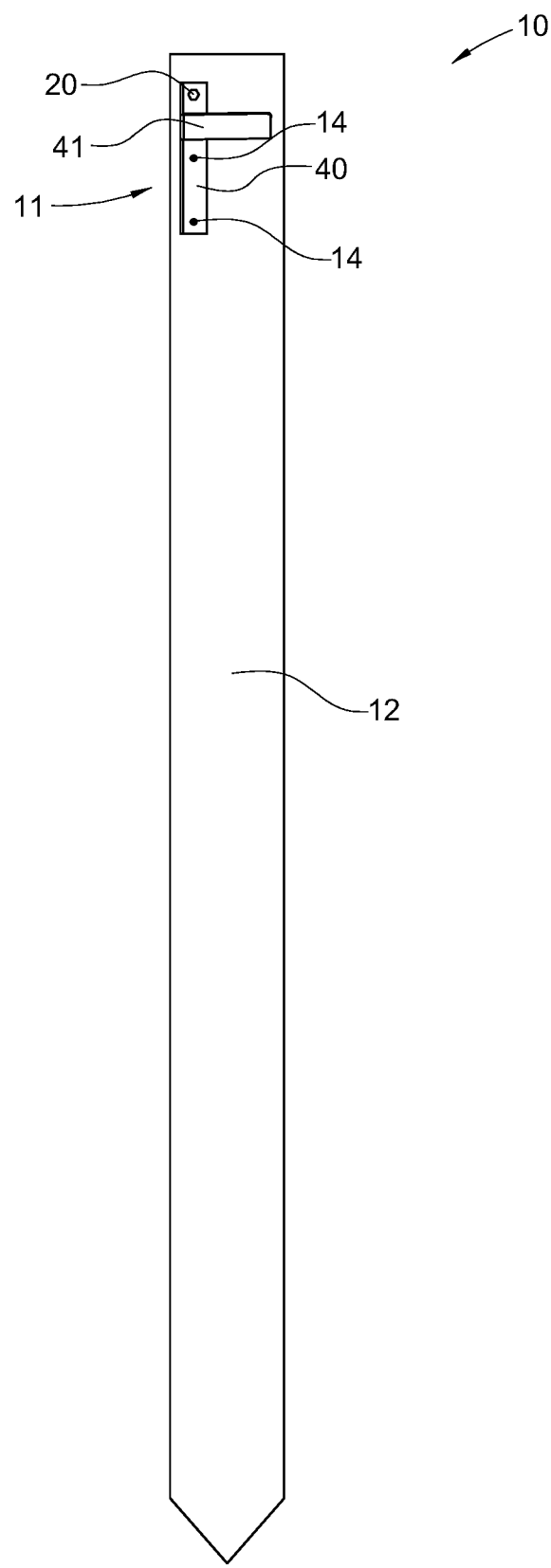
FIG. 1 depicts a front view of a bicycle mount system of the present invention.

With reference to FIG. 1, bicycle mount system 10 generally includes a bracket 11 attached to a wall support 12 using preferably two screws 14. A shown in the enlarged view of bracket 11 depicted in FIG. 4, bracket 11 is preferably a one-piece structure comprising a substantially flat portion 40 for attaching bracket 11 to wall support 12, and an arm member 41 for supporting a wheel of bicycle 60. Although, bracket 11 is depicted and described as a one-piece structure, a person having ordinary skill in the art will appreciate that bracket 11 can be constructed using multiple pieces connected to create a substantially equivalent structure. Bracket 11 is preferably constructed of metal, such as steel or aluminum, but may also be constructed of wood, plastic, or any other material that is sufficient to support the weight of bicycle 60.

Figure 2:
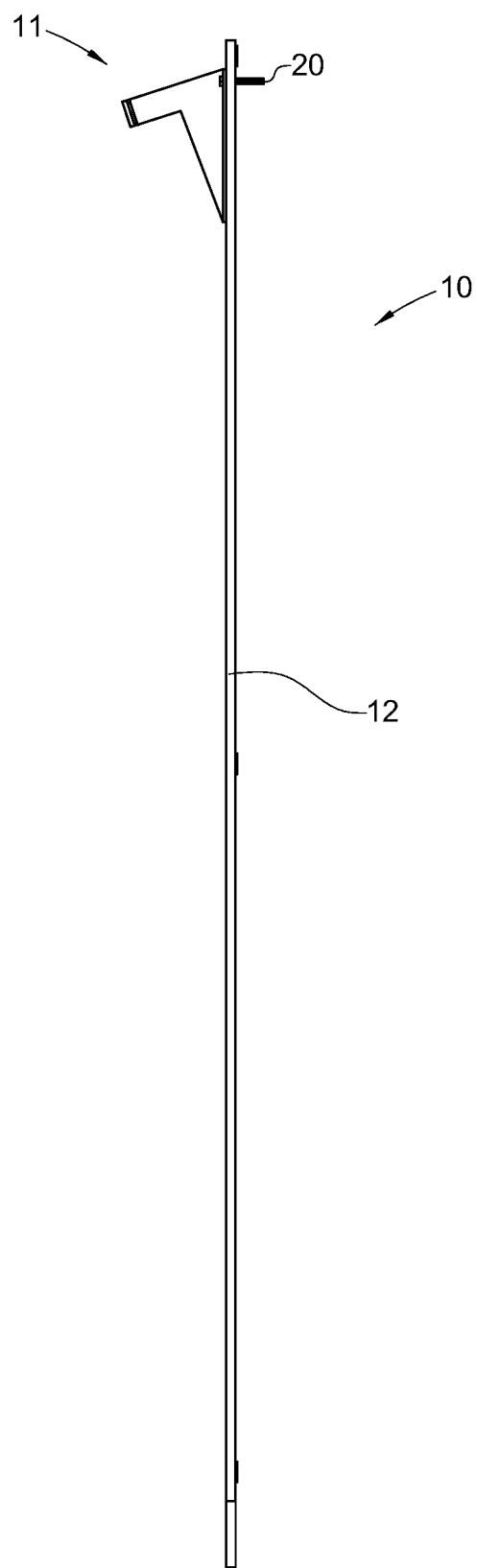
FIG. 2 depicts a side view of the bicycle mount system of FIG. 1.
Figure 3:
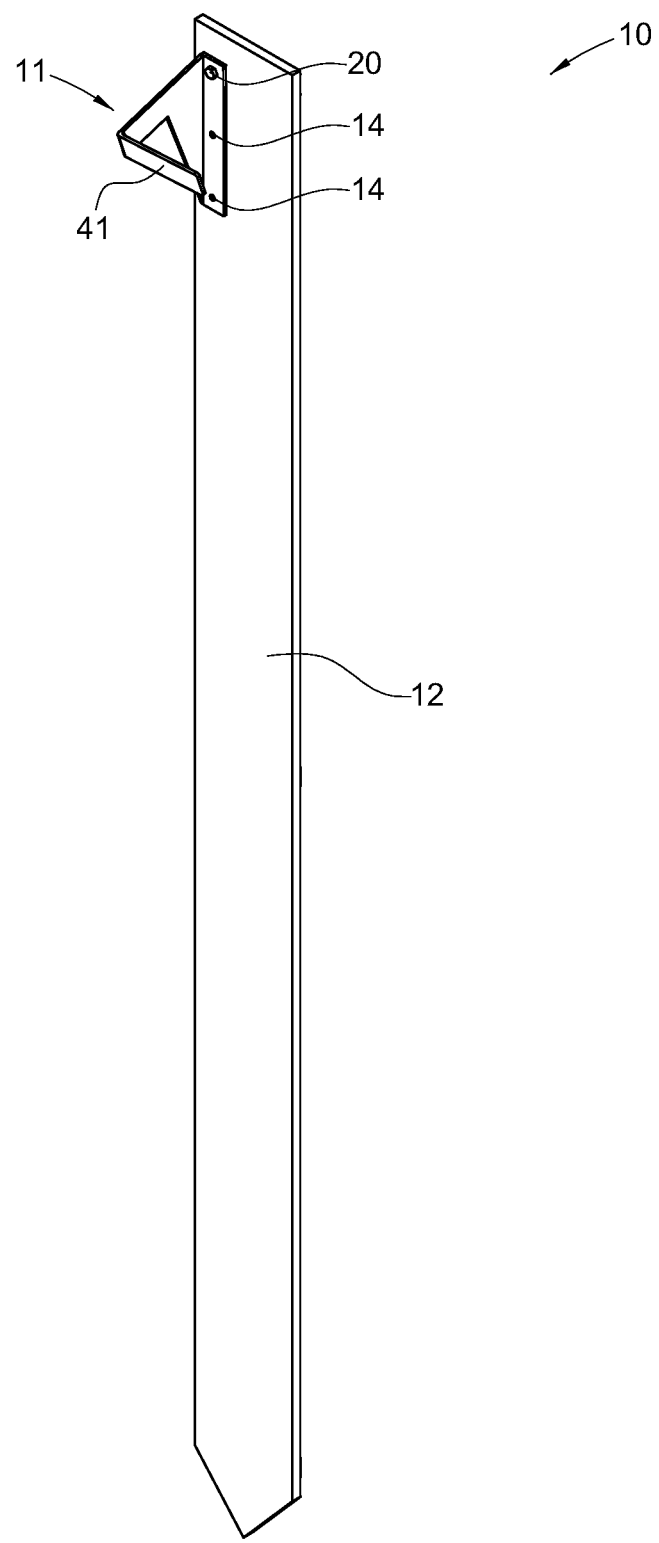
FIG. 3 depicts a front perspective view of the bicycle mount system of FIG. 1.

With reference to FIG. 2, a side view of the bicycle mount system 10 is depicted. Of particular interest, a single anchor 20 is shown for connecting bicycle mount system 10 to wall 61 (shown in FIG. 6). Anchor 20 may be any type of threaded fastener, such as a lag bolt, lag screw, wood screw, or the like. A person having ordinary skill in the art will appreciate that the anchor 20 must be selected to appropriately support the weight of bicycle mount system 10 and bicycle 60. Anchor 20 preferably extends through flat portion 40 and wall support 12 as illustrated in FIG. 2 and FIG. 4. As shown in FIG. 2, it is preferred that anchor 20 is the sole support for connecting bicycle mount system 10 to wall 61. FIG. 3 provides a front isometric view of bicycle mount system 10.

With reference to FIG. 5, a rear isometric view of bicycle mount system 10 is illustrated. As depicted in FIG. 5, three soft fasteners 50 are shown. Soft fasteners 50 may be selected from a number of materials, such as foam tape (preferred), double-sided tape, Command™ strips, or any other type of soft adhesive strip. The function of soft fasteners 50 is to provide secondary anchoring of bicycle mount system 10 to wall 61, and specifically the prevention of lateral or rotational movement of bicycle mount system 10 about anchor 20. In other words, soft fasteners 50 function to maintain bicycle mount system 10 in a substantially vertical orientation. Soft fasteners 50 also serve to provide a slight separation of wall support 12 from wall 30, further protecting wall 30 from damage. Although FIG. 5 depicts three soft fasteners 50, it is within the scope and intent the present invention that a varying number of soft fasteners 50 may be used. For example, if one soft fastener 50 is used, it would preferably be located near the bottom of wall support 12. As another example, if two soft fasteners are used, one would be preferably be located near the bottom of wall support 12, with the second located near the top of wall support 12. Alternatively, four or more soft fasteners may also be used, with one located near the top, one located near the bottom, and the rest spaced substantially equally apart along the length of wall support 12.

As discussed above, FIG. 6 depicts bicycle mount system 10 anchored to wall 61 using anchor 20 and three soft fasteners 50 (not visible). As shown in the preferred arrangement, bicycle 60 is attached to bracket 11 by lifting bicycle 60 upwards and engaging front wheel 62 over and then onto arm member 41, which then supports front wheel 62 via gravity. Back wheel 63 is thereby supported in resting engagement with wall support 12. To remove bicycle 60 from bicycle mount system 10, bicycle 60 is lifted upwards such that front wheel 62 is no longer in engaged with arm member 41, allowing bicycle 60 to be lowered to the floor. Alternatively, not shown in FIG. 6, bicycle 60 may be hung in reverse as described above, with back wheel 63 engaged with arm member 41 and front wheel 62 in resting engagement with wall support 12.

In another embodiment of the present invention, a method for storing a bicycle is provided, in which bicycle mount system 10 is anchored to wall 61 as described above. When bicycle mount system 10 is removed from wall 61, the only damage to wall 61 is the hole remnant left by anchor 21, which can be easily patched by means well known in the art. This method and system provide an improvement over prior art system that leave multiple holes to be repaired, as well as further damage resulting from the lower wheel contacting the wall directly.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. It is therefore evident that the particular embodiments disclosed above may be altered or modified and all such variations are considered within the scope and spirit of the present invention.

What is claimed is:

1. A bicycle mount system for vertically attaching a bicycle to a wall, comprising:
   a wall support member comprising an upper portion and lower portion;
   a bracket member fixedly attached to the upper portion of the wall support member, wherein the bracket member comprises a substantially flat portion for attachment to the wall support member and an arm member for engaging a first wheel of the bicycle; and
   an anchor, wherein the anchor passes through the flat portion of the bracket member and the wall support member and is adapted to engage the wall;
   wherein the second wheel of the bicycle is adapted to be in resting engagement with the lower portion of the wall support member.

2. The bicycle mount system of claim 1, further comprising one or more soft fasteners attached to a back of the wall support member.

3. The bicycle mount system of claim 2, wherein each soft fastener comprises a strip of foam tape.

4. The bicycle mount system of claim 1, wherein the anchor comprises a threaded fastener.

* * * * *